United States Patent [19]

Short, Jr. et al.

[11] 3,759,095

[45] Sept. 18, 1973

[54] STRIP DETECTION APPARATUS

[75] Inventors: Ray L. Short, Jr., Glenview; Howard Bowen, Wilmette; David L. Henderson, Mundelein, all of Ill.

[73] Assignee: Research Technology Incorporated, Skokie, Ill.

[22] Filed: July 16, 1971

[21] Appl. No.: 163,243

[52] U.S. Cl. .................................. 73/157, 73/159
[51] Int. Cl. .............................................. G01n 3/20
[58] Field of Search ...................... 73/157, 159, 160, 73/88.5 SD; 340/259, 260

[56] References Cited
UNITED STATES PATENTS
2,934,949   5/1960   Grunwald ........................... 73/157

OTHER PUBLICATIONS
"Acoustics" by Beranek copyright 1954 pages 164–177.
"Physics" by Hausmann et al. copyright 1935, 1939 pages 509–510.

Primary Examiner—Richard C. Queisser
Assistant Examiner—Denis E. Corr
Attorney—Carlton Hill et al.

[57] ABSTRACT

A device for detecting flaws in a film strip having a feeler for sensing the surface of the film as it is moved rapidly through the device and using a piezoelectric element in response to movement of the feeler for generating a pulse whenever a flaw is detected in the film. The circuit which couples the electrical signal from the piezoelectric crystal to a utilization point such as a counter, includes a capacitor having a value of capacitance which is designed to block gradually changing electrical signals from the piezoelectric element and to pass signals which change rapidly. In this way gradual changes in thickness in the film do not produce a readable output signal, while cracks in the edge of the film or damaged sprocket holes or tape splices will generate a sudden output signal which may be read as a flaw in the film.

12 Claims, 5 Drawing Figures

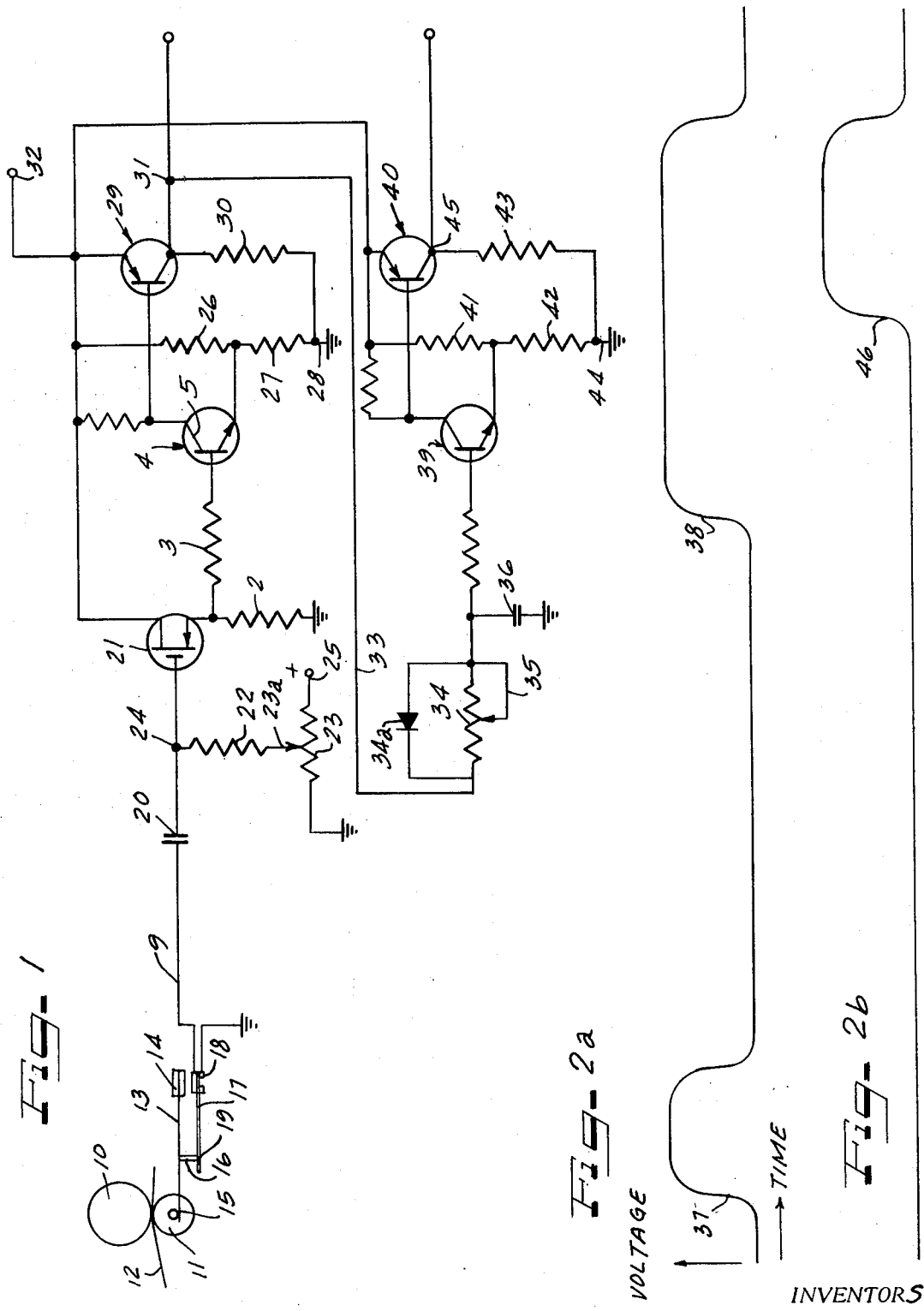

Patented Sept. 18, 1973
3,759,095
2 Sheets-Sheet 2
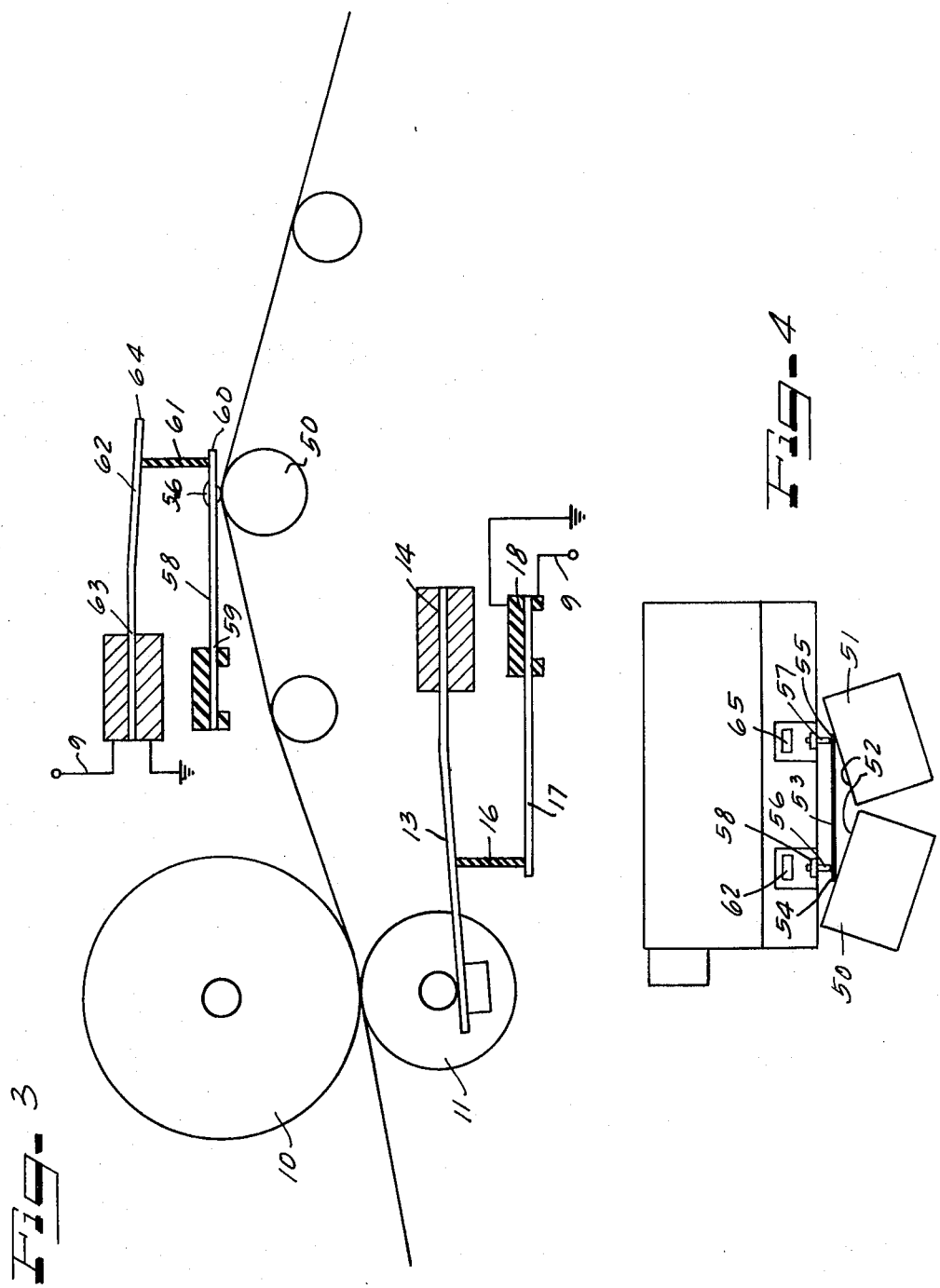
INVENTORS
RAY L. SHORT, JR.
HOWARD BOWEN
DAVID L. HENDERSON
ATTORNEYS 3,759,095

STRIP DETECTION APPARATUS

BACKGROUND OF THE INVENTION

1. Description of the Prior Art

Prior art devices for detecting flaws in film have generally used mechanical contact points to detect changes in the thickness or character of the film. For instance, the contact points were set to make contact at the nominal thickness of the film, and increases in the thickness such as would occur during a splice would cause the contacts to pull apart thereby generating a signal. However, such devices also generated signals in response to variations in the thickness of the film which did not correspond to flaws desired to be detected. By the use of the present device, only actual flaws in the film are responded to by an output signal.

2. Field of the Invention

The field of art to which this invention pertains is devices which are capable of detecting breaks or other defects in a film which is being moved at a high speed through the device.

SUMMARY OF THE INVENTION

It is a principal feature of the present invention to provide an improved device for detecting flaws in a moving film strip.

It is another feature of the present invention to provide a device which is capable of distinguishing between flaws in a moving strip of film and other variations or inconsistencies in the film.

It is a principal object of the present invention to provide a film strip detection device which utilizes a piezoelectric element as the means for developing an electrical signal in response to the presence of flaws or defects in the film.

It is also an object of the present invention to provide a film strip flaw detection device utilizing a ceramic element as the means for sensing variations in the normal consistency of the film wherein a capacitor is connected in series with the output of the piezoelectric element and the capacitor, is designed to block electrical signals from the element which represent gradual changes in thickness of the film while permitting electrical signals to pass through the capacitor which reflect abrupt changes in the thickness or abrupt defects in the film.

It is another object of the present invention to provide a device as described above wherein the means for sensing changes in the character of the moving film comprise a roller which is attached to a spring arm in a cantilever manner and which is mechanically coupled to a piezoelectric element so that deflection of the roller in response to sudden increases in the thickness of the film will also cause deflection of the piezoelectric element.

It is another object of the present invention to provide a device as described above wherein the moving film is caused to pass against a pair of angled rods, the rods being angled to form a concave saddle for the film so that the edges of the film contact the rods and the center of the film is spaced from the base of the concave saddle and wherein another feeler means are disposed at the opposite surface of the film to detect sprocket hole defects and cracks in the edge of the film.

These and other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a schematic of the arrangement of the splice detection means for the device of the present invention showing the use of the piezoelectric element and the circuit means associated therewith for producing and processing a signal which may be used as an indicator of splices and flaws in the film.

FIG. 2a is a waveform of a voltage signal produced by different types of splices in a moving film to aid in the explanation of the operation of the circuit of FIG. 1.

FIG. 2b is a waveform on the same time base as that shown in FIG. 2a, showing the output from the defective splice indicating circuit.

FIG. 3 is a more detailed schematic of the feeler means and the associated piezoelectric element used to produce a defect output signal.

FIG. 4 is an end view of a portion of the device shown in FIG. 4.

DESCRIPTION OF THE PREFERRED EMBODIMENT

The present invention relates to a device for detecting defects in a moving film strip and in particular to a device which utilizes a piezoelectric element as the means for sensing changes in the normal consistency of the film strip.

The present invention utilizes feelers to sense changes in thickness of the film, and these feelers then transmit movement developed by changes in thickness to the piezoelectric elements which in turn produce output voltages indicating the presence of a change in thickness. Since the film itself has variations in thickness, and since it is not desired to detect such variations as flaws, the piezoelectric element in combination with a suitable capacitor in series therewith is ideal for distinguishing between the two types of variations in the film. When there is a gradual variation in the film thickness, the piezoelectric element produces a gradually increasing output signal which is blocked by the capacitor. However when the changes in film thickness are abrupt or when a break occurs in the film, the feeler is moved quickly, and a rapid pulse of energy is passed by the capacitor to be read as a flaw indication.

Referring to the drawings in greater detail, FIG. 1 shows an arrangement for detecting changes in the film thickness. In FIG. 1, a guide means such as a support roller 10 is shown in conjunction with a smaller roller 11 which is used as a feeler to detect changes in the film thickness. The film 12 is passed between the rollers, and variations in thickness of the film will cause the roller 11 to move downwardly from a starting position.

The roller 11 is mounted on a spring arm 13 which is fixed at one end 14 and which has the roller 11 mounted to the free end 15.

A resilient block 16 is disposed between the spring arm 13 and a piezoelectric element 17. The piezelectric element 17 is also mounted in a cantilever form with a first end 18 fixedly mounted and a second end 19 being the free end. Accordingly, movements of the spring arm 13 due to changes in thickness of the film will cause the piezoelectric element 17 to be moved downwardly by the force of the resilient member 16.

As is well understood in the prior art, piezoelectric elements produce output signals when pressure is applied to them as described above. In this case, the output signal is coupled along a circuit line 9 to a capacitor 20. The capacitor 20 is in series with the output from the piezoelectric element and is designed so that gradual changes in the output from the element 17 will be blocked, while rapid changes in the output from the element 17 will be passed by the capacitor 20.

This combination of the use of the piezoelectric element 17 and the capacitor 20 makes possible the detection of flaws in the film strip without detecting over-all variances in the thickness or resilience of the film itself. In prior art devices using mechanical contacts, once the contacts were set, even variations in the film itself produced an indication of a flaw which was a false indication. By the use of the element 17 and the capacitor 20, such false indications are eliminated, and a signal is only passed by the capacitor 20 which is indicative of a rapid change in thickness of the film such as may occur from an improper splice in the film. Capacitor 20 is shown for clarity only, since the piezoelectric element Y may behave as if it had an internal series capacitor.

The output of the capacitor 20 is coupled to the input of a field effect transistor 21. The transistor 21 is biased by a resistor 22 through a further resistor 23 which has a variable contact 23a. The resistors 22 and 23 are coupled from a circuit point 24 to a positive DC supply at 25.

The transistor 21 has a resistor 2 coupled from its source to circuit ground as shown. The source of the transistor 21 is coupled through a resistor 3 to the base of a further transistor 4. The transistor 4 operates as a threshold device, and develops an output signal at its collector 5 only when the transistor 21 produces a signal of a given magnitude. Bias for the transistor 4 is determined by a pair of resistors 26 and 27 which are coupled to circuit ground at 28 and to the positive DC supply at point 32 as shown.

The collector 5 of the transistor 4 is coupled to a transistor 29 which has its emitter coupled to the positive DC supply 32 and which has its collector coupled through a resistor 30 to circuit ground at the point 28. The output of the transistor 29 is taken from its collector at a circuit point 31.

Accordingly, a signal is developed at the circuit point 31 which is indicative of a rapid change in thickness of the film such as may be produced by a splice. This information may then be coupled to a counter or other device at the output thereof which is used to indicate the number of splices in the film strip.

Also the output 31 may be coupled through a circuit line 33 to a further circuit which is used to turn off the machine when a flaw occurs. The further circuit includes a resistor 34 having a movable contact 35 and a capacitor 36. The contact 35 is used to set the time constant for the capacitor 36 for the purpose of preventing an output signal from a normal splice and only generating output signals from an improper splice. A diode 34a provides a low impedance path for rapidly discharging the capacitor 36 to eliminate the possibility of an output response to a series of short duration pulses.

Referring to FIG. 2, a normal splice is shown at 37. The duration of this splice may be in the order of 1 ms. However, an improper splice which is shown at 38 may have a duration of about 2 ms. Accordingly, the time constant of the elements 34 and 36 are set so that the normal splice will not charge the capacitor 36 to a suitable level for turning on a transistor 39. However, the improper splice 38 will have a sufficient time duration to charge the capacitor 36 to a sufficient level to turn on the transistor 39. The transistor 39 is in turn coupled to a further transistor 40 and the combination of the transistors 39 and 40 operate similarly to the transistors 4 and 29 described above. Also biasing resistors 41, 42 and 43 are connected in a similar manner between the respective elements and circuit ground at 44. The output of the transistor 40 is taken at a circuit point 45 and may be coupled to any suitable device for stopping the machine so that the defect can be corrected. The signal thus derived at 45 is illustrated in FIG. 2b showing the relative time relationship between the input waveform 37, 38 and the output waveform 46.

Referring to FIG. 2b, once the time constant of the elements 34 and 36 have been established, the resulting signal developed at the output 45 may take the form shown at 46. It is noted that no output is generated in response to the presence of the normal splice 37, and a pulse 46 is generated in response to the tape splice 38. The pulse 46 only begins after the tape splice pulse 38 has existed for a sufficient period of time to charge the capacitor 36. At that point the pulse is initiated at the output 45 and is used to trigger the machine stop mechanism.

Referring to FIG. 3, the portion shown in FIG. 3 which also relates to the mechanism described above is similarly numbered, and further discussion is not required. However, in FIGS. 3 and 4, a further detection device is shown. In particular, a pair of sapphire rods 50 and 51 are angled as shown in FIG. 5 so as to provide a V-shaped or concave saddle illustrated by the reference numeral 52. The film 53 passes against the saddle so that the longitudinal edges 54 and 55 contact the upper surface of the rods 50 and 51. The film is supported between the rods by its own rigidity, and as a result, the center portion of the film is spaced from the base of the V or saddle 52.

A pair of feeler means 56 and 57 are arranged at opposite edges of the film to detect cuts or defects in the sprocket holes of the film.

Referring to FIG. 4, the feeler 56 may be a sapphire bead or the like which is attached to a spring arm 58. The spring arm 58 is attached at a fixed end 59 and has the sapphire element 56 attached to its free end 60. A resilient block or rubber block 61 is disposed as shown between the spring arm 58 and the ceramic piezoelectric element 62. The piezoelectric element 62 is also mounted in a cantilever manner with a fixed end 63 and a free end 64.

Referring to FIG. 4, when a crack or flaw in the sprocket hole occurs, the respective feelers 56 and 57 will drop into the saddle. For instance, if a crack occurs in the edge of the film, this will weaken the film so that it will no longer support itself in a horizontal plane but will at least partially collapse into the concave portion of the saddle at 52 so as to allow one or both the spring loaded feelers 56 and 57 to drop. This then produces an output from the respective ceramic element 62 or 65 which is measured in separate circuits similar to those shown in FIG. 1. In the case of a sprocket hole being defective, then the feeler associated therewith which is larger than a normal sprocket hole will simply drop through the enlarged sprocket hole and indicate the presence of the flaw there. The rods 50 and 51 and the tips of the elements 56 and 57 are selected to be of sapphire to prevent excessive wear due to the abrasive nature of the rapidly moving film through the device. For instance, the film may be moving through the device at a speed of 1,200 feet per minute or greater.

Accordingly, the present invention provides a means for rapidly detecting flaws in a film strip and for distinguishing between the presence of the flaws and other irregularities or variations in the normal consistency of the film.

It will be understood that various modifications and combinations of the features of this invention may be practiced without departing from the scope of the invention as set forth in the claims.

I claim as my invention:

1. In a device for detecting flaws in a moving strip including guide means for supporting the moving strip in position to be detected, a flexible feeler member disposed oppositely of said guide means, means for passing the strip between the guide means and the feeler means so that a portion of the feeler means is in operative contact with a surface of the strip, a cantilever supported transducer element supported in spaced relation to said flexible feeler member of said strip, said cantilever supported transducer element supported in spaced relation to said flexible feeler member of said strip, said cantilever supported transducer element being disposed generally in a plane substantially perpendicular to the direction of normal movement of said flexible feeler when it is responding to changes in thickness of said strip, means for coupling to said transducer element those forces received at said feeler member due to changes in characteristics of said strip for causing limited excursion of said transducer element for processing and utilizing an electrical signal developed thereby.

2. A device in accordance with claim 1 wherein a capacitor is coupled in series between said transducer element and said circuit means, said capacitor having a value of capacitance such as to block gradual changes in electrical signals derived from said transducer element and to permit the passage of electrical signals which reflect relatively abrupt movement of said surface of the strip as detected by said feeler means.

3. A device in accordance with claim 1 wherein said feeler means comprises a member in sliding engagement with said surface of the strip, a spring arm, the spring arm having a supported end and a free end, and said member being disposed near the free end.

4. A device in accordance with claim 3 wherein the transducer element is disposed adjacent to the spring arm of the feeler means and wherein means are provided to mechanically couple the spring arm to the transducer element for transmitting forces from the spring arm to the element.

5. A device in accordance with claim 4 wherein the transducer element has a supported end and a free end and wherein said mechanical coupling means comprises a resilient member disposed between the spring arm and a point adjacent to the free end of the element wherein flexing of the spring arm transmits forces to the element for generating an electrical output therefrom.

6. A device in accordance with claim 1 wherein the guide means comprises a first roller and wherein the feeler means comprises a cantilever supported spring arm having a second roller rotatably mounted at the free end thereof, means passing the strip between the two rollers, and said cantilever supported spring arm normally causing said first and second rollers to frictionally engage said strip as said strip is passed therebetween.

7. A device in accordance with claim 1 wherein said transducer element comprises a piezoelectric element.

8. A device in accordance with claim 1 wherein said feeler member and said transducer element are disposed in substantially parallel planes and wherein said feeler member is a cantilever supported spring member.

9. A device in accordance with claim 8 wherein said coupling means comprises a member disposed generally perpendicularly between said flexible feeler and said transducer.

10. A device in accordance with claim 9 wherein said coupling member contacts said flexible feeler at a point which is spaced laterally from the point of contact of said flexible feeler with said strip, whereby said coupling member limits the force transmitted to said transducer.

11. A device in accordance with claim 10 wherein said coupling member is formed of a relatively resilient material.

12. A device for detecting flaws in a moving strip comprising guide means for supporting the moving strip in position to be detected, feeler means disposed oppositely of said guide means, means for passing the strip between the guide means and the feeler means so that the feeler means is in operative contact with a surface of the strip, said feeler means being flexibly mounted so as to be readily responsive to movement of the position of said surface in a predetermined direction, a transducer element being mechanically responsive to movement of the feeler member for producing an electrical signal having magnitude which varies in response to the degree of movement of said feeler and circuit means coupled to said transducer element for processing and utilizing the electrical signal developed thereby, said guide means including a pair of rods disposed at an angle with respect to each other to form a V-shaped saddle, the strip being passed over the saddle so that both longitudinal edges contact opposite legs of the inner surface of the V with the surface of the strip between the longitudinal edges being spaced from the base of the V, said feeler means being spring biased into a contacting relation with a surface of the strip oppositely of said member at a point where said strip is in spaced relation with said member, whereby defects in the strip cause the strip to at least partially collapse into the base of the V-shaped saddle to generate movement of said feeler means and hence an electrical signal from the transducer element.

* * * * *